(12) United States Patent
Lee et al.

(10) Patent No.: US 7,761,790 B2
(45) Date of Patent: Jul. 20, 2010

(54) SYSTEM AND METHOD FOR CREATING XML FILES FROM AN EDITED DOCUMENT

(75) Inventors: Chung-I Lee, Taipei Hsien (TW); Hai-Hong Lin, Shenzhen (CN); De-Yi Xie, Shenzhen (CN); Chen-Chen Zhang, Shenzhen (CN); Wen-Feng Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 366 days.

(21) Appl. No.: 11/757,401

(22) Filed: Jun. 4, 2007

(65) Prior Publication Data
US 2008/0140698 A1 Jun. 12, 2008

(30) Foreign Application Priority Data
Dec. 8, 2006 (CN) .................. 2006 1 0157361

(51) Int. Cl.
*G06F 17/00* (2006.01)
(52) U.S. Cl. ...................................... 715/249
(58) Field of Classification Search ........... 715/267, 715/249, 234, 236, 239, 277
See application file for complete search history.

(56) References Cited

U.S. PATENT DOCUMENTS 6,826,553 B1 * 11/2004 DaCosta et al. ............... 707/1
2003/0101416 A1 * 5/2003 McInnes et al. ............. 715/513
2005/0144557 A1 * 6/2005 Li et al. ..................... 715/513
2005/0204337 A1 * 9/2005 Diesel et al. ................ 717/113
2006/0248440 A1 * 11/2006 Rhoads et al. .............. 715/500
2006/0259524 A1 * 11/2006 Horton ....................... 707/201
2007/0008564 A1 * 1/2007 Friedman et al. .......... 358/1.11
2007/0240036 A1 * 10/2007 Wake et al. ................. 715/513
2008/0140698 A1 * 6/2008 Lee et al. ................... 707/102
2008/0278740 A1 * 11/2008 Bird et al. ................. 358/1.15
2008/0295005 A1 * 11/2008 Salesin et al. .............. 715/763

OTHER PUBLICATIONS

Owens, Phil, "Composer Tutorial, Part II", Archived Sep. 29, 2004 http://www.austincc.edu/powens/Composer/compose2.htm.*
Tiff Tag Reference, Exif Tags, Archive Mar. 29, 2005 http://www.awaresystems.be/imaging/tiff/tifftags/privateifd/exif.html.*

(Continued)

*Primary Examiner*—Adam M Queler
(74) *Attorney, Agent, or Firm*—Frank R. Niranjan

(57) ABSTRACT

A computer-based method for creating XML files from an edited document is disclosed. The method includes the steps of: reading an edited document from a file transfer protocol (FTP) server; reading each of equation objects originally existed in the edited file and creating a tag image file (TIF) image according to the equation object being read; creating a joint photographic experts group (JPEG) image according to the TIF image and recording a pixel size of the JPEG image; creating an XML character string according to each paragraph in the edited file; inserting the XML character strings into different XML file templates, thereby obtaining different XML files. A related system is also disclosed.

14 Claims, 4 Drawing Sheets

OTHER PUBLICATIONS

"Tiff header modification", Last Post Sep 30, 2005, http://n2.nabble.com/Tiff-header-modification-td2064767.html.*

"Math Forum: Math Expressions as GIFs", Archived May 19, 2005, http://mathforum.org/typesetting/gif.howto.html.*

"Clipboard: Using the OLE Clipboard Mechanism", MSDN, Visual Studio 2003, http://msdn.microsoft.com/en-us/library/6wwww2be1(VS.71,printer).aspx.*

Matthews, Rick, "Digital image file types", Archived Jun. 14, 2005 http://www.wfu.edu/~matthews/misc/graphics/formats/formats.html.*

Matsakis, Niko, "Re: Split XML and output to different files: msg#00914", Nov. 20, 2002, http://osdir.com/ml/text.xml.xsl.general.mulberrytech/2002-11/msg00914.html.*

* cited by examiner

SYSTEM AND METHOD FOR CREATING XML FILES FROM AN EDITED DOCUMENT

BACKGROUND OF THE INVENTION

1. Field of the Invention

The present invention is related to a system and method for creating XML files from an edited document which is edited via a specific file editing tool such as a Microsoft Word or the like.

2. Description of Related Art

Extensible markup language (XML) is an internationally standard for structuring information, the XML enables information to be compatible across different platforms. XML files consist of nested elements, and each of the elements may contain content. The element or nested elements contains a start tag, a close tag, and content in between them.

Given the widespread use of XML in both private and business environments, there is a growing demand for the ability to create XML files from a Microsoft Word document. For example, when sending a patent application (a Microsoft Word document) to a patent office, there is a desirable to transmit the patent application through the Internet instead of mailing it by post. When sending the patent application to the official body by network, it is required to create the XML files from the patent application.

Therefore, what is needed is a system and method for creating XML files from an edited document file such as a Microsoft Word file.

SUMMARY OF THE INVENTION

A system for creating XML files from edited files which are edited via a specific file editing tool is provided in accordance with a preferred embodiment. The system includes an extensible markup language (XML) creating server and a file transfer protocol (FTP) server, the FTP server being configured for storing edited files to be used to create XML files. The XML creating server includes a file loading module, a TIE creation module, an image processing module, and an XML creating module. The file loading module is configured for reading the edited file to be used to create the XML files from the FTP server. The TIF creation module is configured for reading each of equation objects originally existed in the edited file and creating a tag image file (TIF) image corresponding to each of the equation objects. The image processing module is configured for creating a joint photographic experts group (JPEG) image corresponding to each of the created TIF image, and recording a pixel size of the JPEG image. The XML creating module is configured for creating an XML character string of each of the paragraphs in the edited file, inserting the XML character strings into different XML file templates, thereby obtaining different XML files.

A computer-based method for creating extensible markup language (XML) files from edited files which are edited via a specific file editing tool is also provided. The method includes the steps of: reading an edited file from a file transfer protocol (FTP) server; reading each of equation objects originally existed in the edited file and creating a tag image file (TIF) image corresponding to each of the equation objects being read; creating a joint photographic experts group (JPEG) image according to the TIF image and recording a pixel size of the JPEG image; creating an XML character string from each of the paragraphs in the edited file; inserting the XML character strings into different XML file templates, thereby obtaining different XML files.

Other systems, methods, features, and advantages of the present invention will be or become apparent to one with skill in the art upon examination of the following drawings and detailed description.

DETAILED DESCRIPTION OF THE INVENTION

Figure 1:
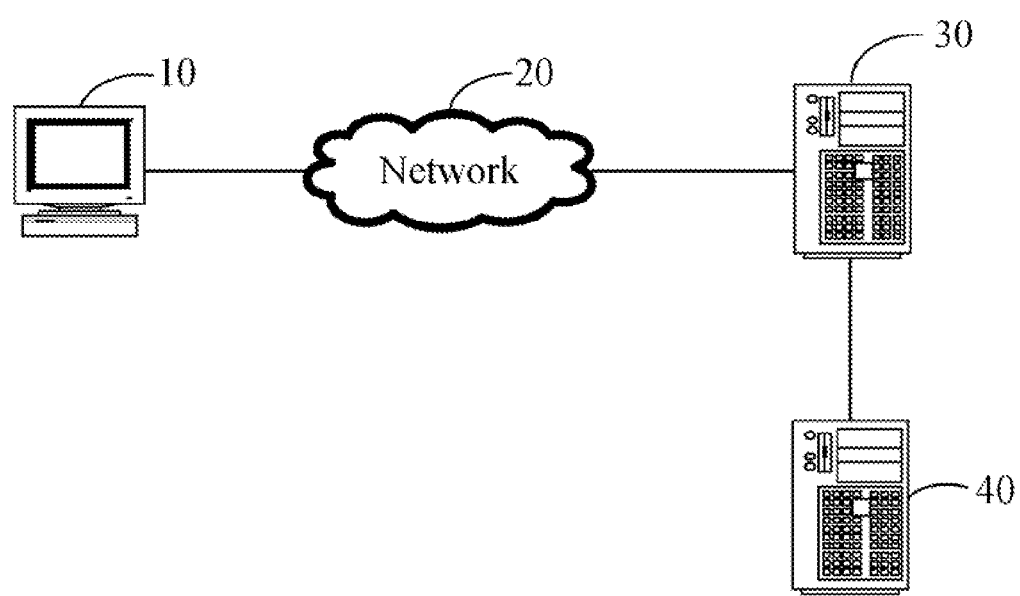
FIG. 1 is a schematic diagram of a hardware configuration of a system for creating XML files from an edited document in accordance with a preferred embodiment.

FIG. 1 is a schematic diagram of a hardware configuration of a system (hereinafter, "the system") for creating extensible markup language (XML) files from an edited document, such as a Microsoft Word file in accordance with a preferred embodiment. The system typically includes a user computer 10, an XML creating server 30, and a file transfer protocol (FTP) server 40. The user computer 10 connects to the XML creating server 30 through a network 20. The FTP server 40 connects with the XML creating server 30 and stores edited documents (files) which are edited by a specific editing tool such as Microsoft Word. In the preferred embodiment, each of the edited files is a patent application, and includes an abstract field, a specification field, and a claims field.

The XML creating server 30 is configured for receiving a create XML request (i.e., creating XML files from the edited file, such as Word file) sent from the user computer 10, and for creating the XML files from the edited file. Before creating the XML files from the edited file, the XML creating server 30 reads each equation object in the edited file, creates a tag image file (TIF) image according to each equation object, and creates a joint photographic experts group (JPEG) image according to the TIF image. Then, the XML creating server 30 creates an XML character string according to each paragraph in the edited file. A detailed description is as follows. The XML creating server 30 reads one of the paragraphs in the edited file, and records a paragraph field of the paragraph (i.e., the section of the document the paragraph belongs to). The paragraph field includes the abstract, the specification, and the claims. The XML creating server 30 determines the paragraph field by keywords such as the "abstract", the "specification", and the "claims". The XML creating server 30 determines whether the paragraph contains any of the equation objects. If the paragraph does not contain any of the equation objects, the XML creating server 30 directly creates the XML character string of the paragraph in the edited file. If the paragraph contains the equation objects, the XML creating server 30 reads each of the elements in the paragraph sequentially, determines whether the element is a text character or the equation object. If the element is the text character, the XML creating server 30 creates an XML character of the text character in the XML character string. If the element is the equation object, the XML creating server 30 reads the JPEG images of the equation object according to a specified path of the JPEG image, creates an XML character string of the equation object, and appends it to the XML character string.

When all the paragraphs in the edited file has been read, the XML creating server 30 inserts all the XML character strings into different XML file templates according to the paragraph fields and by the paragraph's order of presence in the edited file, thereby obtaining different XML files. The XML file templates include an abstract template XML file, a specification template XML file, and a claims template XML file. For example, the XML creating server 30 inserts the XML character strings of the abstract to the abstract template XML file to obtain the XML file of the abstract, inserts the XML character strings of the specification to the specification template XML file to obtain the XML file of the specification, and inserts the XML character strings of the claims to the claims template XML file to obtain the XML file of the claims. If the patent application only includes the abstract (i.e., the patent application of a design), the XML creating server 30 inserts the XML character strings of the abstract to the abstract template XML file, and obtains the XML file of the abstract.

Figure 2:
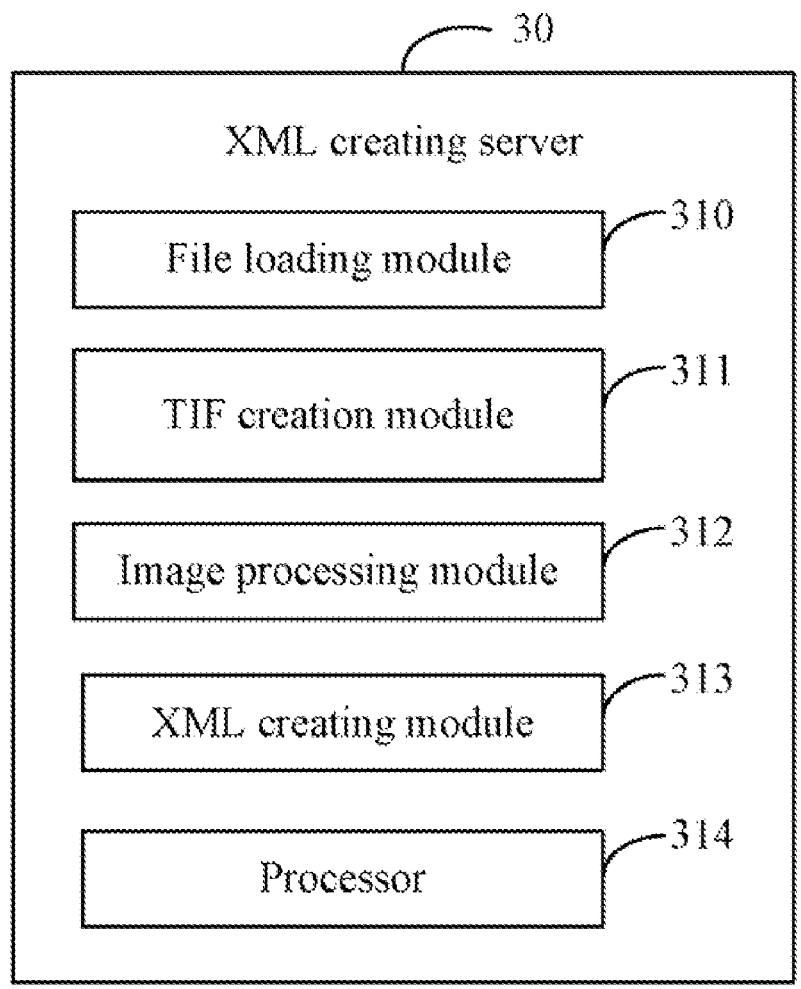
FIG. 2 is a schematic diagram showing function modules of an XML creating server of the system of FIG. 1.

FIG. 2 is a schematic diagram showing function modules of the XML creating server 30. The XML creating server 30 may include a file loading module 310, a TIF creation module 311, an image processing module 312, and an XML creating module 313. At least one processor 314 of the XML creating server 30 can execute the file loading module 310, the TIF creating module 311, the image processing module 312, and the XML creating module 313.

The file loading module 310 is configured for reading the edited file to be used to create the XML files from the FTP server 40 when the XML creating server 30 receives the create XML request from the user computer 10. The TIF creation module 311 is configured for reading each equation object in the edited file, copying the equation object onto a clipboard, creating a tag image File (TIF) image according to each equation object on the clipboard, saving the TIF image at a specified path such as a specific folder on the XML creating server 30, and saving the specified path in an image location array. The TIF creation module 311 reads the equation objects via invoking a component object model (COM).

The image processing module 312 is configured for reading each of the paths (i.e., the specified path of the TIF image of the equation object) from the image location array, obtaining the TIF image of the equation object according to the specified path adjusting a definition of the TIF image, creating the joint photographic experts group (PEG) image according to the TIF image, and recording a pixel size of the PEG image.

The XML creating module 313 is configured for reading each of the paragraphs in the edited file, creating the XML character string according to each paragraph in the edited file, inserting the XML character strings into the different XML file templates according to the paragraph fields and by the paragraph's order of presence in the edited file, thereby obtaining the different XML files.

Figure 3:
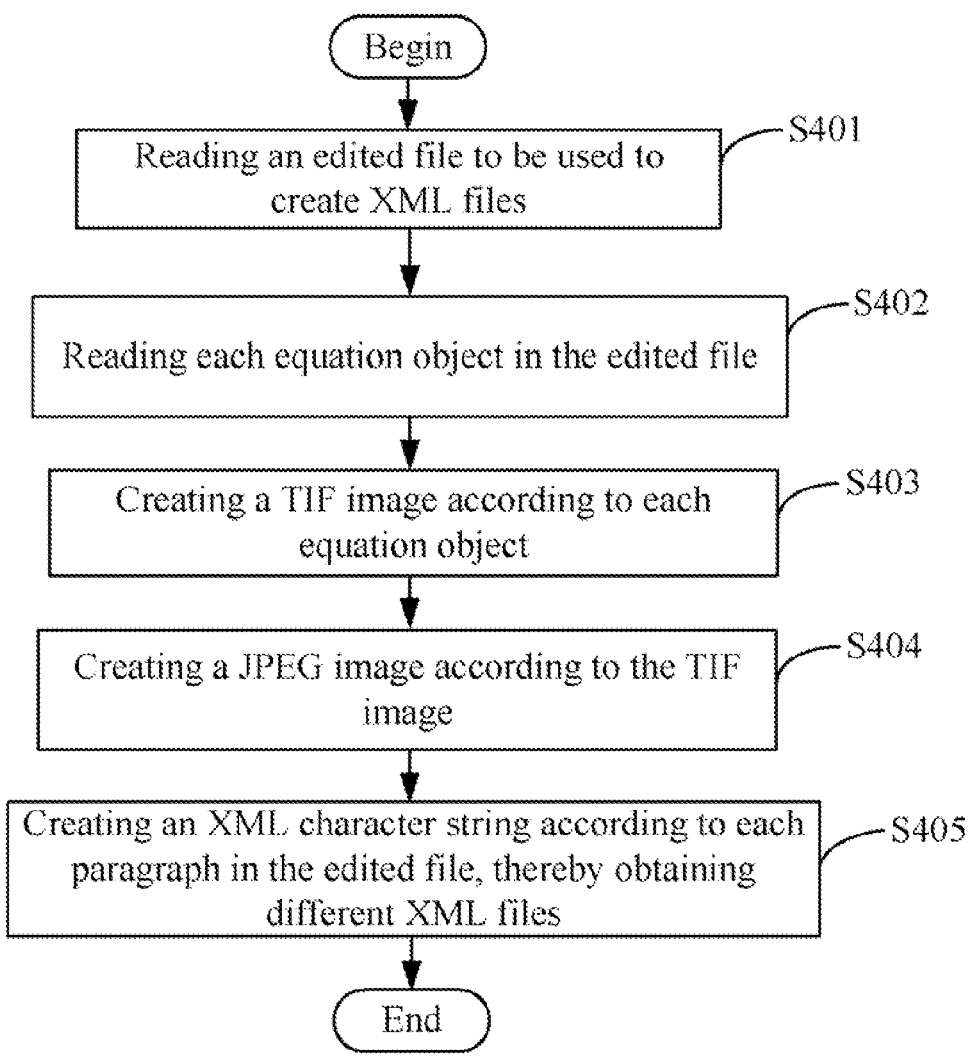
FIG. 3 is a flowchart of a preferred method for creating XML files from an edited document, in accordance with one embodiment.

FIG. 3 is the flowchart of the preferred method for creating the extensible markup language (XML) files from the edited document (Word file), in accordance with one embodiment. In step S401, when the XML creating server 30 receives the create XML request from the user computer 10, the file loading module 310 reads the edited file to be used to create the XML files from the file transfer protocol (FTP) server 40.

In step S402, the TIE creation module 311 reads each equation object in the edited file, and copies the equation object onto the clipboard.

In step S403, the TIF creation module 311 creates the tag image file (TIF) image according to each equation object on the clipboard, saves the TIF image at the specified path, and saves the specified path in the image location array.

In step S404, the image processing module 312 reads each of the paths the specified path of the TIF image of the equation object) from the image location array, obtains the TIF image according to the specified path, adjusts the definition of the TIF image to comply with regulations of the organization receiving the XML documents, creates the joint photographic experts group (JPEG) image according to the TIE image, and records the pixel size of the PEG image.

In step S405, the XML creating module 313 reads each of the paragraphs in the edited file, creates the XML character string of each of the paragraphs in the edited file, inserts all the XML character strings into the different XML file templates according to the paragraph fields and by the paragraph's order of presence in the edited file, thereby obtains the different XML files. A detailed description is as follows.

Figure 4:
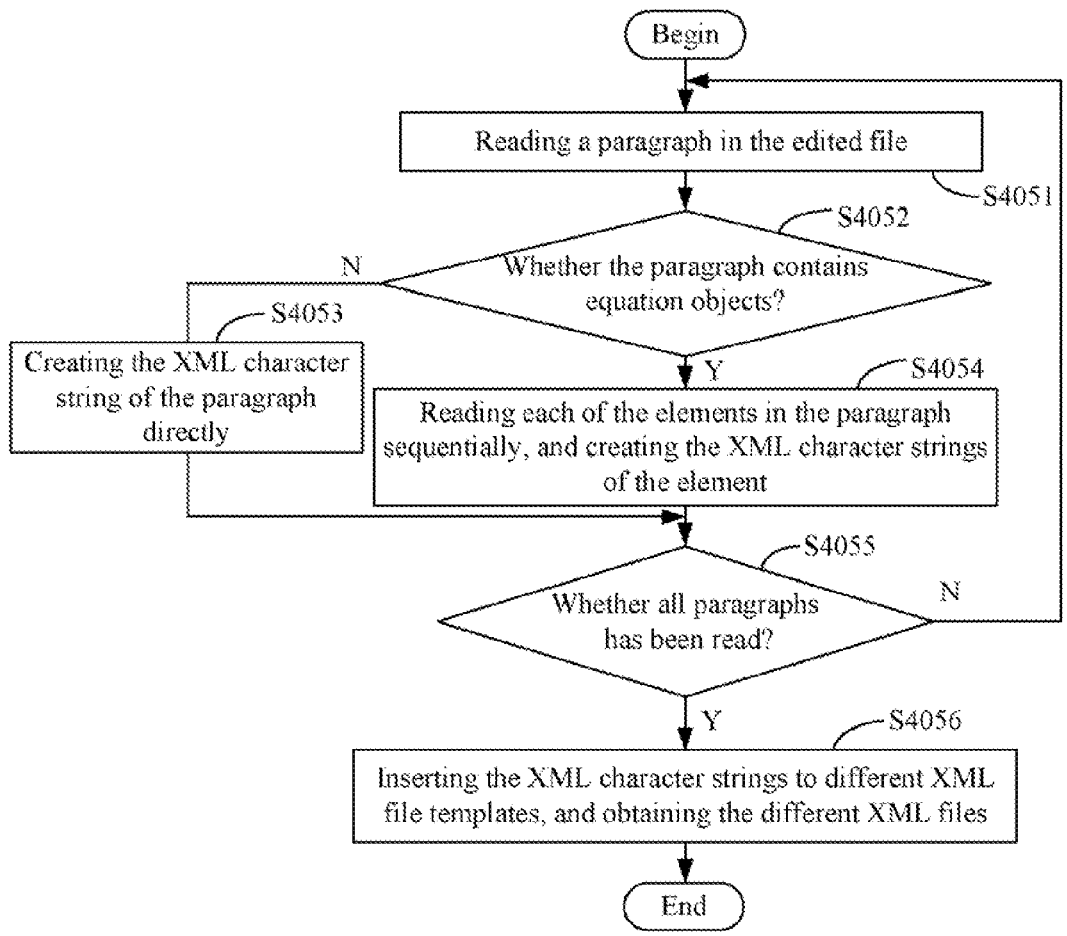
FIG. 4 is a flowchart of details of one step of FIG. 3, namely creating the XML character string corresponding to each paragraph of the edited document to obtain the XML files.

FIG. 4 is a flowchart of details of step S405, namely creating the XML character string corresponding to each paragraph of the edited document to obtain the XML files, in step S4051, the XML creating module 313 reads one of the paragraphs in the edited file, and records the paragraph filed of the paragraph (i.e., the section of the document the paragraph belongs to). The paragraph field includes the abstract, the specification, and the claims. The XML creating module 313 determines the paragraph field by keywords such as the "abstract", the "specification", and the "claims".

In step S4052, the XML creating module 313 determines whether the paragraph contains any of the equation objects.

If the paragraph does not contain any of the equation objects, in step S4053, the XML creating module 313 directly creates the XML character string of the paragraph in the edited file.

If the paragraph contains the equation objects, in step S4054, the XML creating module 313 reads each of the elements in the paragraph sequentially, determines whether the element is the text character or the equation object. If the element is the text character, the XML creating module 313 creates the XML character of the text character in the XML character string. If the element is the equation object, the XML creating module 313 reads the JPEG images of the equation object according to the specified path of the JPEG image, creates XML character string of the equation object, and appends it to the XML character string.

In step S4055, the XML creating module 313 determines whether all the paragraphs in the edited file has been read. If any paragraph in the edited file has not been read, the procedure returns to step S4051.

Otherwise, if all the paragraphs has been read, in step S4056, the XML creating module 313 inserts the XML character strings belong to the different paragraph fields into the different XML file templates, thereby obtains the different XML files. For example, the XML creating module 313 inserts the XML character strings of the abstract to the abstract template XML file and obtains the XML file of the abstract, inserts the XML character strings of the specification to the specification template XML file and obtains the XML file of the specification, and inserts the XML character strings of the claims to the claims template XML file and obtains the XML file of the claims. If the patent application only includes an abstract (i.e., the patent application of a design), the XML creating module 313 inserts the XML character strings of the abstract to the abstract template XML file, and obtains the XML file of the abstract.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for creating XML files from edited files which are edited via a specific file editing tool, the system comprising an extensible markup language (XML) creating server and a file transfer protocol (FTP) server, the FTP server being configured for storing edited files to be used to create XML files, the XML creating server comprising:

a file loading module configured for reading the edited the to be used to create the XML files from the FTP server, wherein the edited file is a patent application comprising an abstract field, a specification field, and a claims field;

a TIF creation module configured for reading each of equation objects originally existed in the edited file, copying each of the equation objects of the edited file onto a clipboard, creating a tag image file (TIF) image of each of the equation objects on the clipboard, and saving the TIF image at a specified path;

an image processing module configured for reading the specified path of the TIF image, obtaining the TIF image according to the specified path, adjusting a definition of the TIF image, creating a joint photographic experts group (JPEG) image, and recording a pixel size of the PEG image;

an XML creating module configured for reading each paragraph in the edited file sequentially, and recording a paragraph field of the paragraph, determining if the paragraph contains any of the equation objects, creating the XML character string of the paragraph in the edited file if the paragraph does not contain any of the equation objects, reading each of the elements in the paragraph sequentially if the paragraph contains the equation objects, and determining if the element is a text character or the equation object, creating the XML character of the text character in the XML character string if the element is the text character, or reading the JPEG images of the equation object according to the specified path of the JPEG image if the element is the equation object, creating and appending the XML character string of the equation object to the XML character string, inserting the XML character strings into different XML file templates if all the paragraph have been read, thereby obtaining different XML files; and at least one processor that executes the file loading module, the TIF creating module, the image processing module, and the XML creating module.

2. The system according to claim 1, wherein the TIF creation module reads each of equation objects existed in the edited file by invoking a component object model (COM).

3. The system according to claim 1, wherein the specified path is stored in an image location array.

4. The system according to claim 1, wherein the paragraph field comprises the abstract field, the specification field, and the claims field.

5. The system according to claim 4, wherein the XML file templates comprises an abstract template XML file, a specification template XML file, and a claims template XML file.

6. The system according to claim 5, wherein the XML creating module inserts the XML character strings into different XML file templates, thereby obtaining different XML files by:

inserting the XML character strings of the abstract to the abstract template XML file and obtains the XML file of the abstract;

inserting the XML character string of the specification to the specification template XML file and obtains the XML file of the specification; and inserting the XML character strings of the claims to the claims template XML file and obtains the XML file of the claims.

7. The system according the claim 5, wherein the XML creating module inserts the XML character strings of the abstract to the abstract template XML file and obtains the XML file of the abstract, if the edited file only comprises an abstract.

8. A computer-based method for creating extensible markup language (XML) files from edited files which are edited via a specific file editing tool, the method comprising the steps of:

reading an edited file from a file transfer protocol (FTP) server, wherein the edited file is a patent application comprising an abstract field, a specification field, and a claims field;

reading each of equation objects originally existed in the edited file, copying each of the equation objects of the edited file onto a clipboard, creating a tag image file (TIF) image of each of the equation objects on the clipboard, and saving the TIF image at a specified path;

reading the specified path of the TIF image, obtaining the TIF image according to the specified path, adjusting a definition of the TIF image, creating a joint photographic experts group (JPEG) image, and recording a pixel size of the JPEG image;

reading each paragraph in the edited file sequentially, and recording a paragraph field of the paragraph;

determining if the paragraph contains any of the equation objects;

creating the XML character string of the paragraph in the edited file if the paragraph does not contain any of the equation objects;

reading each of the elements in the paragraph sequentially if the paragraph contains the equation objects, and determining if the element is a text character or the equation object;

creating the XML character of the text character in the XML character string if the element is the text character, or reading the JPEG images of the equation object according to the specified path of the JPEG image if the element is the equation object, creating and appending the XML character string of the equation object to the XML character string; and inserting the XML character strings into different XML file templates if all the paragraphs have been read, thereby obtaining different XML files.

9. The method according the claim 8, wherein the TIF creation module reads each of equation objects existed in the edited file by invoking a component object model (COM).

10. The method according to claim 8, wherein the specified path is stored in an image location array.

11. The method according to claim 8, wherein the paragraph field comprises the abstract field, the specification field, and the claims field.

12. The method according the claim 11, wherein the XML file templates comprises an abstract template XML file, a specification template XML file, and a claims template XML file.

13. The method according to claim 12, wherein inserting the XML character strings into different XML file templates, thereby obtaining different XML files comprises:

inserting the XML character strings of the abstract to the abstract template XML file and obtains the XML file of the abstract;

inserting the XML character strings of the specification to the specification template XML file and obtains the XML file of the specification; and inserting the XML character strings of the claims to the claims template XML file and obtains the XML file of the claims.

14. The method according to claim 12, wherein inserting the XML character strings into different XML file templates, thereby obtaining different XML files comprises:

inserting the XML character strings of the abstract to the abstract template XML file and obtains the XML file of the abstract, if the edited file only comprises an abstract.

\* \* \* \* \*